Nov. 19, 1957   G. D. WETIG   2,813,749
GLARE SHIELD FOR MOUNTING ON THE COWL OF AN AUTOMOBILE
Filed Jan. 19, 1956
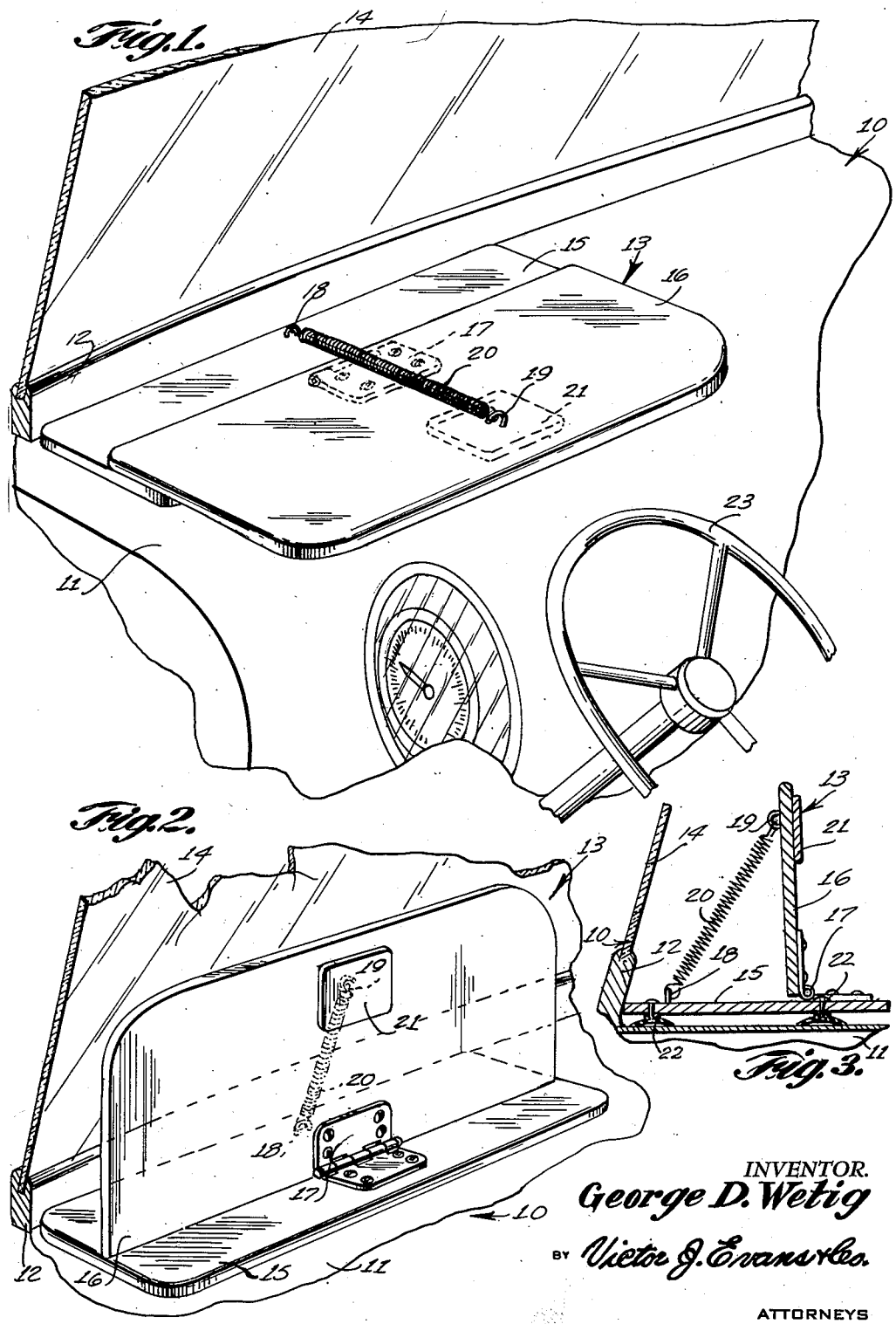
INVENTOR.
George D. Wetig
BY Victor J. Evans & Co.
ATTORNEYS

2,813,749

GLARE SHIELD FOR MOUNTING ON THE COWL OF AN AUTOMOBILE

George D. Wetig, Seward, Kans.

Application January 19, 1956, Serial No. 560,145

1 Claim. (Cl. 296—97)

This invention relates to a vehicle accessory, and more particularly to a glare shield for a vehicle.

The object of the invention is to provide a shield which is adapted to be mounted in a vehicle such as an automobile whereby annoying glare from the sun's rays will be prevented or eliminated so that the vehicle can be driven more safely and with greater comfort.

Another object of the invention is to provide a glare prevention mechanism which includes a base that is adapted to be secured to the upper portion of the cowl of a vehicle such as an automobile, there being a shield hingedly connected to the base and whereby the shield can be moved to either a vertical or horizontal position as desired.

A further object of the invention is to provide a glare shield which is extremely simple and inexpensive to manufacture.

Other objects and advantages will be apparent during the course of the following description.

In the accompanying drawings, forming a part of this application and in which like numerals are used to designate like parts throughout the same, Figure 1 is a fragmentary perspective view showing the glare prevention mechanism of the present invention mounted in a vehicle and showing the shield in lowered or horizontal position.

Figure 2 is a view similar to Figure 1, but showing the shield in raised or vertical position.

Figure 3 is a sectional view taken through the glare shield and showing a modification wherein suction cups are used for securing the base to the cowl.

Referring in detail to the drawings, the numeral 10 designates a portion of a vehicle which may be an automobile or the like, and the vehicle 10 includes the usual cowl 11, frame 12, and inclined windshield 14 which is arranged at the front of a vehicle.

The present invention is directed to a glare eliminating or preventing mechanism which is indicated generally by the numeral 13, and the glare preventing mechanism 13 includes a base 15 which can be made of any suitable material. The base 15 may be made of a semiflexible material so that it can be made to conform to the shape of the cowl 11. The base 15 may be secured to the top of the cowl 11 in any suitable manner.

The present invention further includes a shield 16 which is hingedly connected to the base 15 by means of a hinge 17, and the shield 16 can be moved to the vertical position as shown in Figure 2, so as to prevent the sun's rays from shining in the eyes of the driver or other occupant of the vehicle. Or, when desired the shield 16 can be pivoted downwardly to the horizontal position shown in Figure 1, when it is not being used or when it is not needed.

There is further provided a coil spring 20, and one end of the coil spring 20 is arranged in engagement with a bracket 18 which is secured to the upper surface of the base 15. The other end of the coil spring 20 engages an eyelet or bracket 19 which is secured to the shield 16. A counterweight 21 may be secured to the shield 16 for properly balancing or stabilizing the shield.

The base 15 may be secured to the cowl 11 in any suitable manner, as for example by means of a suitable adhesive. However, in Figure 3 there is shown a modification wherein suction cups 22 may be provided for securing the base 15 to the cowl 11.

In Figure 1 the numeral 23 designates the usual steering wheel of the vehicle.

From the foregoing, it is apparent that there has been provided a device or mechanism which will reduce the glare from the sun's rays. In use, the base 15 can be secured to the cowl 11 in any suitable manner, as for example by means of a suitable adhesive, or else the base 15 can be connected to the cowl by means of the suction cups 22 as shown in Figure 3. When the device is not being used, the shield 16 can be moved to the horizontal or lowered position shown in Figure 1. However, when the shield is to be used for eliminating glare from the sun's rays, the shield 16 can be pivoted from the position shown in Figure 1 to the position shown in Figure 2. The shield 16 is of such a size that it will not interfere with the normal vision of the driver or other occupant of the vehicle. The spring 20 maintains the shield 16 in its adjusted position, and the counterweight 21 may be used for stabilizing the shield 16 in its adjusted position. The base 15 can be made of a suitable yieldable or some semi-flexible material so that it will conform to the configuration of the cowl. The shield 16 may be painted or colored with any desired color so as to increase the effectiveness of the device.

With the present invention installed in a vehicle such as an automobile, the vehicle can be driven more safely and comfortably since there will be no annoying glare shining in the driver's eyes. The parts can be made of any suitable material and of any desired size and shape. The shield 16 may be painted or otherwise colored brown so as to help cut down on the glare. The spring 20 maintains the shield in its adjusted positions and the shield can be readily pivoted by the driver's hand. The base is secured in place without screws, bolts, or other members which might harm the vehicle.

The present invention will also eliminate glare from any source such as glare resulting from headlights of approaching vehicles.

I claim:

In combination in a vehicle including a cowl, a frame, and an inclined windshield extending upwardly from said frame, of a glare preventing device mounted on said cowl rearwardly of said windshield, said glare preventing device comprising a horizontally disposed base mounted on said cowl, and a shield hingedly connected to the upper surface of said base, a bracket secured to the upper surface of said base, an eyelet secured to said shield, and a coil spring extending between said bracket and eyelet, a counterweight connected to said shield, said shield being mounted for movement into and out of a horizontal or vertical position, and suction cups for connecting said base to said cowl.

References Cited in the file of this patent

UNITED STATES PATENTS

| 1,671,180 | Dahl | May 29, 1928 |
| 2,187,027 | Harvey | Jan. 16, 1940 |
| 2,253,766 | Crowell | Aug. 26, 1941 |
| 2,410,171 | Le Lande | Oct. 29, 1946 |
| 2,519,222 | Brooks | Aug. 15, 1950 |
| 2,703,255 | Penwell | Mar. 1, 1955 |

FOREIGN PATENTS

| 719,804 | Great Britain | Dec. 8, 1954 |